United States Patent
Li et al.

(10) Patent No.: US 8,248,909 B2
(45) Date of Patent: Aug. 21, 2012

(54) METHOD AND DEVICE FOR THE BASEBAND PROCESS OF THE SPACE-TIME/SPACE-FREQUENCY/SPATIAL DIVERSITY TRANSMITTER

(75) Inventors: Dong Li, Shanghai (CN); Guosong Li, Shanghai (CN); Xialong Zhu, Shanghai (CN); Hongwei Yang, Shanghai (CN); Liyu Cai, Shanghai (CN)

(73) Assignee: Alcatel Lucent, Paris (FR)

( * ) Notice: Subject to any disclaimer, the term of this patent is extended or adjusted under 35 U.S.C. 154(b) by 214 days.

(21) Appl. No.: 12/296,841

(22) PCT Filed: Apr. 9, 2007

(86) PCT No.: PCT/CN2007/001141
§ 371 (c)(1),
(2), (4) Date: Jul. 13, 2009

(87) PCT Pub. No.: WO2007/118411
PCT Pub. Date: Oct. 25, 2007

(65) Prior Publication Data
US 2009/0303866 A1   Dec. 10, 2009

(30) Foreign Application Priority Data
Apr. 13, 2006 (CN) .......................... 2006 1 0025681

(51) Int. Cl.
*H04J 11/00* (2006.01)
(52) U.S. Cl. .................................................. 370/207
(58) Field of Classification Search .......... 370/203–211; 455/101–103, 10, 504–506
See application file for complete search history.

(56) References Cited

U.S. PATENT DOCUMENTS

| | | | |
|---|---|---|---|
| 5,235,338 A | 8/1993 | Hsiao et al. | |
| 2008/0298316 A1* | 12/2008 | Bitran et al. | 370/329 |
| 2008/0318567 A1* | 12/2008 | Popovic et al. | 455/422.1 |

FOREIGN PATENT DOCUMENTS

| | | |
|---|---|---|
| CN | 1604509 | 4/2005 |
| JP | 2004-171253 | 6/2004 |

OTHER PUBLICATIONS

International Search Report for International Application No. PCT/CN2007/001141.
"Uplink MIMO SC-FDMA Scheme for EUTRA", 3GPP TSG RAN WG1#43, InterDigital Communications Corporation, R1-015368, Nov. 7-11, 2005, pp. 1-6, Seoul, Korea.

* cited by examiner

*Primary Examiner* — Kerri Rose
(74) *Attorney, Agent, or Firm* — Fay Sharpe LLP (57) ABSTRACT

A method and device for the baseband process of space-time/space-frequency/spatial diversity transmitter in the SC-FDMA system, the device is characterized in that: 1) an encoding means is connected to the output end of the M-point DFT module; 2) a space-time encoding means, for encoding the corresponding symbol of at least two adjacent symbol sets, and outputting at least two data sets; each sub-carrier mapping means maps respectively each data set to the corresponding antenna, so that the mapped data satisfy the requirements: The symbols mapped on each antenna keep the same sequence as the M symbols outputted by the M-point DFT module; the mapped symbols keep the same sub-carrier interval; the M data of each mapped SC-FDMA symbol are the M outputted data of the DFT module, or the inverse of the M outputted data, or the complex conjugate of the M outputted data, or the inverse complex conjugate of the M outputted data. The present invention implements effective space diversity, reduces PAPR, and makes frequency domain equalization feasible.

18 Claims, 7 Drawing Sheets

METHOD AND DEVICE FOR THE BASEBAND PROCESS OF THE SPACE-TIME/SPACE-FREQUENCY/SPATIAL DIVERSITY TRANSMITTER

TECHNICAL FIELD

The invention relates to the Single Carrier Frequency Division Multiplexing Access (SC-FDMA) or Discrete Fourier Transform (DFT) -spread Orthogonal Frequency Division Multiplexing (OFDM) system in next generation broadband wireless communications, particularly, to the transmitter structure therein and the method and device for the baseband process in the space-time/space-frequency/spatial diversity transmitter.

BACKGROUND

Figure 1:
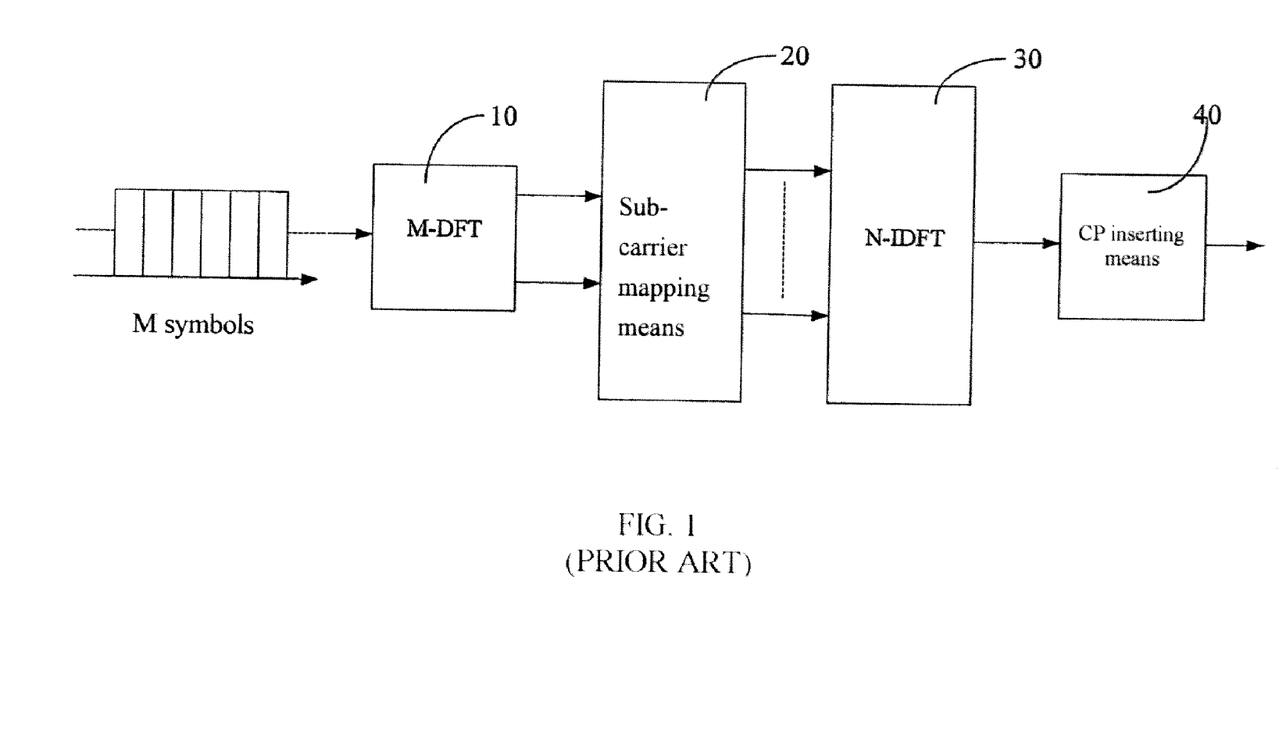
FIG. 1 illustrates the structure diagram for the existing baseband process of the transmitter in SC-FDMA system.

The existing transmitter for Single Carrier Frequency Division Multiplexing Access (SC-FDMA) system is shown in FIG. 1, the working process of which is as follows: the information bit stream is provided to the input end of the M-point DFT module 10 after encoding, interleaving and constellation modulation. Then the outputted data of the M-point DFT module 10 are mapped to the M allocated sub-carriers among N sub-carriers through sub-carrier mapping means 20, wherein, there are two types of sub-carrier mappings: centralized sub-carrier mapping and distributed sub-carrier mapping, and M represents the amount of sub-carriers allocated for transmitting the information. After the (N-M) unmapped sub-carriers are set to zero, the output of the sub-carrier mapping means 20 is transformed to time domain by the N-point Inverse Discrete Fourier Transform (IDFT) of the N-IDFT module 30. Then the output of the N-IDFT module 30 is inserted with Cyclic Prefixes (CP) by the CP inserting means 40, that is to say, copying the last $L_{CP}$ data of the N-point data group of the output of N-point IDFT to the front, wherein $L_{CP}$ represents the CP length. After up-sampling, Digital to Analog (D/A) conversion and carrier modulation, the signal is sent out through a single antenna.

The above-mentioned system is well recognized to be the most promising scheme in the uplink of the next generation broadband wireless communication systems. The system has the following advantages:

(1) Its peak-to-average power ratio (PAPR) is relatively low, and thus the transmitting power can be saved significantly.

(2) It avoids the multiple access interference (MAI) in the uplink of code division multiple access (CDMA) systems by providing orthogonal multi-user access.

(3) With proper time-frequency resource scheduling, it can achieve flexible traffic rate as well as frequency diversity gain or multi-user gain.

(4) With the cyclic prefix (CP) inserted in the time domain, it gives strong equalization ability in the frequency domain.

As compared with the existing wireless communication systems such as UMTS, the next generation systems are characterized by higher spectral efficiency, higher peak data rate as well as average data rate at the cell edge, and sufficient cell coverage.

For these purposes, besides obtaining the time and frequency diversity with time and frequency resource, the next generation communication systems should also make full use of the space resource to obtain the additional spatial diversity; thereby the future systems shall be equipped with multiple transmitting or receiving antennas.

In an SC-FDMA system with multiple antennas, the following two challenges should be considered carefully:

1) How to reduce the peak-to-average power ratio (PAPR) of the transmitter, especially for the uplink, i.e., the communication link from the mobile terminal (MT) to the base station (BS)? Since low PAPR amounts to high efficiency of power amplifier of MT, the lower the PAPR is, the longer the life-span of the batteries at the MT will be, or equivalently, the farther the serving distance from the MT to BS and better the cell coverage will be.

2) How to apply the space-time (ST) or space-frequency (SF) codes in the SC-FDMA systems without considerably increasing the PAPR as well as the complexity of the frequency-domain equalizer at the receiver? A simple equalizer is of great importance to the performance and complexity of the whole system. In order to obtain peak transmission rate as high as possible, broadband communication is inevitable in the next generation wireless systems, this implies that the time-domain equalization of a signal with very broad bandwidth will be quite complicated or even infeasible. Therefore, the frequency-domain equalizer is a certain choice.

Therefore, the applicant is endeavoring to achieve efficient spatial diversity for SC-FDMA systems in order to solve the two technical challenges mentioned above satisfactorily.

SUMMARY OF THE INVENTION

Aiming at SC-FDMA system, the invention provides the technical solution of the transmitter structure of the system and the method and device for the baseband process of the space time/space frequency/spatial diversity transmitter so as to achieve efficient spatial diversity, decrease PAPR as well as make frequency-domain equalizer feasible.

According to one aspect of the invention, there is provided a device for the baseband process of the space-time diversity transmitter.

the device comprises an M-point DFT module, a space-time encoding means and a mapping means, characterized in that:

the time-space encoding means is connected between the output end of the M-point DFT module and the input end of the mapping means, wherein, M represents the amount of sub-carriers allocated to the user.

In the aforesaid device, the space-time encoding means is used for encoding corresponding symbols from at least two adjacent symbol sets, preferably two adjacent symbol sets outputted by the M-point DFT module, and then outputting at least two data sets, preferably two data sets which correspond to the transmitting antennas under one-to-one correspondence, wherein: each symbol set comprises M symbols;

mapping means, comprising at least two sub-carrier mapping means, preferably two sub-carrier mapping means that map the data set to their corresponding antennas, so that the data after mapping satisfy:

the symbols mapped onto each antenna keep the same sequence as compared with the M symbols outputted by the M-point DFT module; and/or the mapped symbols keep the same sub-carrier interval; and/or the M data of each mapped SC-FDMA symbol are the M outputted data of the DFT module, or the inverse of the M outputted data, or the complex conjugate of the M outputted data, or the inverse complex conjugate of the M outputted data.

In the aforesaid device, the encoding uses Alamouti code.

In the aforesaid device, the outputted symbols of the M-point DFT module are connected to said space-time encoding means via a de-multiplexing module.

In the aforesaid device, said sub-carrier mapping means employs the centralized sub-carrier mapping or the distributed sub-carrier mapping.

According to the second aspect of the present invention, there is provided a method for the baseband process of the space-time diversity transmitter, the method comprises the steps of:

de-multiplexing step: de-multiplexing the 2M-point data set outputted by the M-point DFT module of the system, denoted as $\{S_1, S_2, \ldots, S_M, S_{M+1}, \ldots, S_{2M}\}$, into two adjacent symbol sets: $\{S_1, S_2, \ldots, S_M\}$ and $\{S_{M+1}, \ldots, S_{2M}\}$;

space-time encoding step: encoding the data of the corresponding symbols from said two adjacent symbol sets with Alamouti code, and outputting two data sets;

mapping step: mapping said two data sets respectively to two antennas, so that the data after mapping satisfy:

the symbols mapped onto each antenna keep the same sequence as the compared with the M symbols outputted by the M-point DFT module; and/or the mapped symbols keep the same sub-carrier interval; and/or the M data of each mapped SC-FDMA symbol are the M outputted data of the DFT module, or the inverse of the M outputted data, or the complex conjugate of the M outputted data, or the inverse complex conjugate of the M outputted data.

According to the aforesaid method, the two data sets outputted by the space-time encoding step are in the forms of: $\{S_1, S_2, \ldots, S_M, -S_{M+1}^*, \ldots, -S_{2M}^*\}$ and $\{S_{M+1}, S_{M+2}, \ldots, S_{2M}, S_1^*, \ldots, S_M^*\}$, or $\{S_1, S_2, \ldots, S_M, S_{M+1}, S_{M+2}, \ldots, -S_{2M}\}$ and $\{-S_{M+1}^*, \ldots, -S_{2M}^*, S_1^*, \ldots, S_M^*\}$, wherein, the superscript "*" denotes conjugate.

According to the third aspect of the invention, there is provided a space-time diversity transmitter.

The transmitter comprises the aforesaid devices for the baseband process of the space-time diversity transmitter which are connected between the constellation modulator at the front end of the transmitter and the N-point IDFT module at the rear end of the transmitter.

According to the fourth aspect of the invention, there is provided a device for the baseband process of the space-frequency diversity transmitter.

The device comprises an M-point DFT module, a space-frequency encoding means and a mapping means, characterized in that:

the space-frequency encoding means is connected between the output end of the M-point DFT module and the input end of said mapping means, and is used to encode the consecutive M symbols outputted by the M-point DFT module, and to output at least two data sets, preferably two data sets which correspond to the transmitting antennas under one-to-one correspondence, wherein, M represents the amount of sub-carriers allocated to the user.

In the aforesaid device, the mapping means comprises at least two sub-carrier mapping means, preferably two sub-carrier mapping means map the data sets outputted by the space-frequency encoding module respectively to their corresponding antennas, so that the data after mapping satisfy:

the symbols mapped onto at least one antenna keep the same sequence as compared with the M symbols outputted by the M-point DFT module; and/or the mapped symbols keep the same sub-carrier interval; and/or the M data of each mapped SC-FDMA symbol are the M outputted data of the DFT module, or the inverse of the M outputted data, or the complex conjugate of the M outputted data, or the inverse complex conjugate of the M outputted data.

In the aforesaid device, said sub-carrier mapping means employs the centralized sub-carrier mapping or the distributed sub-carrier mapping.

According to a fifth aspect of the invention, there is provided a method for the baseband process of the space-frequency diversity transmitter.

The method comprises the steps of:

space-frequency encoding step: denoting the output of the M-point DFT module of the system as the data set with M points: $\{S_1, S_2, \ldots, S_M\}$, encoding the data set with Alamouti code, and outputting two data sets: $\{S_1, S_2, \ldots, S_M\}$ and $\{-S_2^*, S_1^*, \ldots, -S_M^*, S_{M-1}^*\}$, wherein, the superscript "*" denotes conjugate;

mapping step: mapping said two data sets to two antennas respectively, so that the data after mapping satisfy:

the symbols mapped onto at least one antenna keep the same sequence as compared with the M symbols outputted by the M-point DFT module; and/or the mapped symbols keep the same sub-carrier interval; and/or the M data of each mapped SC-FDMA symbol are the M outputted data of the DFT module, or the inverse of the M outputted data, or the complex conjugate of the M outputted data, or the inverse complex conjugate of the M outputted data.

According to a sixth aspect of the invention, there is provided a space-frequency diversity transmitter.

The transmitter comprises the aforesaid devices for the baseband process of the space-frequency diversity transmitter, which are connected between the constellation modulator at the front end of the transmitter and the N-point IDFT module at the rear end of the transmitter.

According to a seventh aspect of the invention, there is provided a device for the baseband process of the spatial diversity transmitter.

The device comprises an M-point DFT module, an encoding means and a mapping means, as well as a choosing means which is used to choose space-time diversity or space-frequency diversity transmitting method and is connected to said encoding means, said encoding module performs space-time or space-frequency encoding in accordance with the transmitting method chosen by the choosing means, characterized in that: the encoding means is connected between the output end of said M-point DFT module and the input end of said mapping means, wherein, M represents the amount of sub-carriers allocated to the user.

In the aforesaid device, when the encoding means is used for space-time encoding, it encodes the corresponding symbols from at least two adjacent symbol sets, preferably two adjacent symbol sets outputted by the M-point DFT module, and then outputs at least two data sets, preferably two data sets respectively corresponding to the transmitting antennas, wherein, each symbol set comprises M symbols; mapping means, which comprises at least two sub-carrier mapping means, preferably two sub-carrier mapping means for mapping the data sets to their corresponding antennas, such that the data after mapping satisfy:

the symbols mapped onto each antenna keep the same sequence as compared with the M symbols outputted by the M-point DFT module;

the mapped symbols keep the same sub-carrier interval; and the M data of each mapped SC-FDMA symbol are the M outputted data of the DFT module, or the inverse of the M outputted data, or the complex conjugate of the M outputted data, or the inverse complex conjugate of the M outputted data.

In the aforesaid device, when the encoding means is used for space-frequency encoding, it encodes the M consecutive symbols outputted by the M-point DFT module, and outputs at least two data sets, preferably two data sets that correspond to each antennas under one-to-one correspondence; mapping means, comprising at east two sub-carrier mapping means, preferably two sub-carrier mapping means for mapping the data sets respectively to the corresponding antennas, and the data after mapping should meet the following requirements:

the symbols mapped onto at least one antenna keep the same sequence as compared with the M symbols outputted by the M-point DFT module; and/or the mapped symbols keep the same sub-carrier interval; and/or the M data of each mapped SC-FDMA symbol are the M outputted data of the DFT module, or the inverse of the M outputted data, or the complex conjugate of the M outputted data, or the inverse complex conjugate of the M outputted data.

By applying the aforesaid technical solution, the encoding means is set behind the M-point DFT module, therefore, it has the advantage that the receiver can employ space-time decoding and detection in frequency domain effectively, thus avoiding complicated equalizing and processing the multi-channel signal in time-domain. Meantime, the invention proposes an effective space-time/space-frequency encoding and mapping method, so that can prolong the battery lifespan of the mobile terminals (MT) in the uplink communication (i.e., the communication link from the MT to the base station), or equivalently, with the same battery using time, less PAPR makes bigger transmitting power of the MT possible, so that the coverage of the cell can be broaden effectively.

BRIEF DESCRIPTION OF DRAWINGS

Other features, aspects and advantages of the present invention will become clearer by reading the following description with the aid of the drawings. Wherein:

FIG. 4 illustrates the comparisons of PAPR between the two transmitting antennas of the space-time diversity SC-FDMA systems of the invention with the other ones, wherein.

FIG. 5 illustrates the comparisons of PAPR between the two transmitting antennas of the space-frequency diversity SC-FDMA systems of the invention with the other ones, wherein.

Wherein, same or similar reference numerals refer to the same or similar step-features or means-features.

EMBODIMENT OF THE PRESENT INVENTION

Figure 2A:
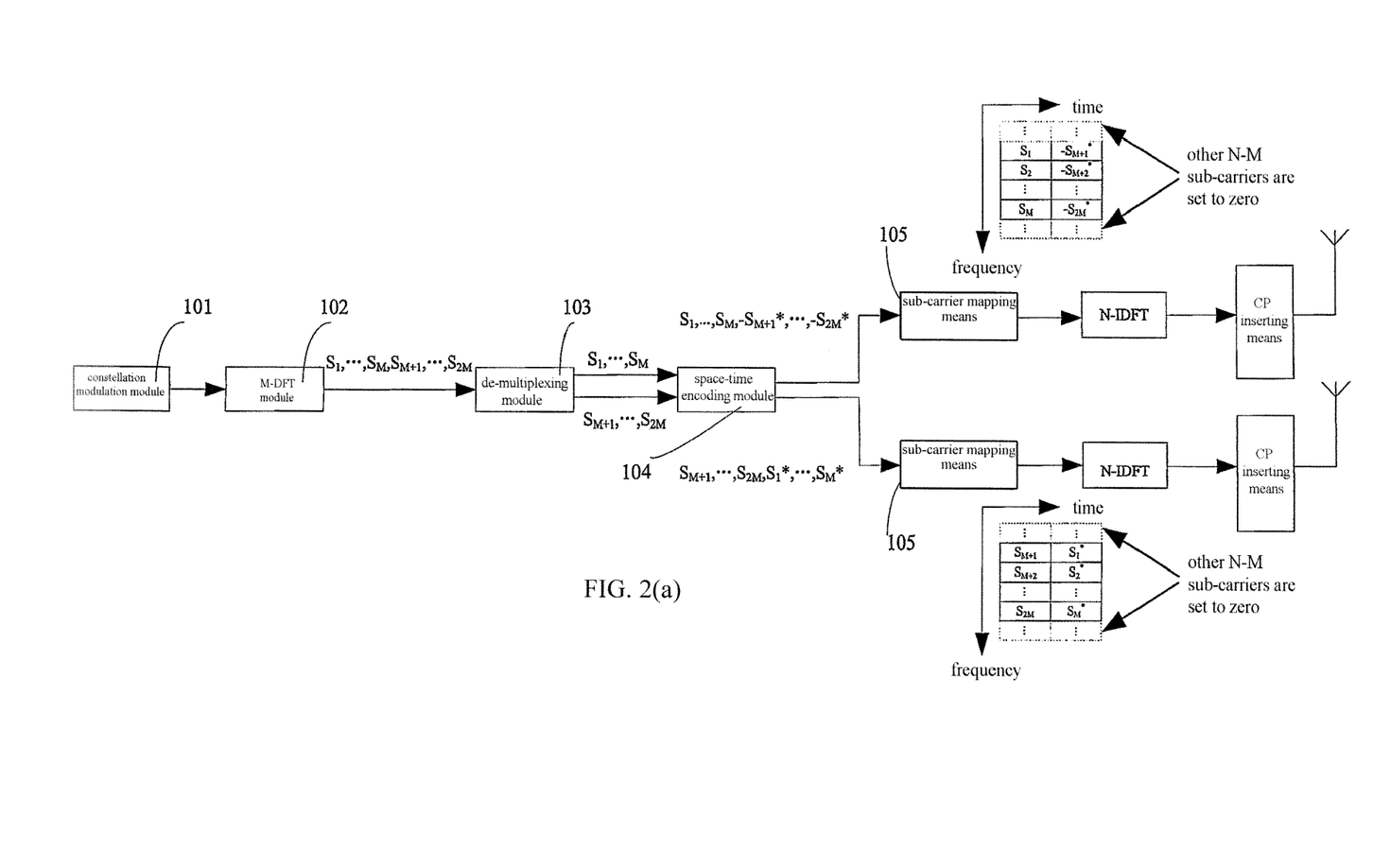
FIG. 2(a)~(b) illustrates the structure diagram for baseband process of space-time diversity transmitter in SC-FDMA system of the invention (two types of space time codes and mapping methods are represented)

I. the space-time diversity transmitter and the method and devices for the baseband process of the space-time diversity transmitter in the SC-FDMA system Referring to FIG. 2, for SC-FDMA system, M represents the amount of sub-carriers allocated to one terminal user, N represents the total amount of sub-carriers For example, with respect to the bandwidth of 10 MHz allocated, if the size of inverse discrete Fourier transform (IDFT) is 1024 and the amount of sub-carriers allocated to one user is 64, then N=1024 and M=64.

FIG. 2 describes the sub-carrier mapping module by taking the centralized sub-carrier mapping as an example.

Still referring to FIG. 2, the space-time diversity transmitter of the invention comprises a constellation modulation module 101, an M-point DFT module 102, a de-multiplexing module 103, a space-time encoding module 104 and two sub-carrier mapping means 105.

The input data of the constellation modulation module 101 is, in the user terminal, the bit-stream outputted by the interleaver which interleaves the outputted bits from channel encoder. The constellation modulating module 101 stands for the constellation modulation such as BPSK (Binary phase-shift keying), QPSK (Quadrature phase-shift keying), 8PSK (8 phase-shift keying), 16QAM (16 Quadrature amplitude modulation), 64QAM (64 Quadrature amplitude modulation) etc, the modulated symbols outputted by the constellation modulation module 101 are transformed by the M-point DFT (Discrete Fourier Transform) module 102, and then are fed to the de-multiplexing module 103, which de-multiplexes each consecutive M symbols into two branches.

The space-time encoding module is used for encoding the corresponding symbols from the two adjacent symbol sets outputted by the M-point DFT module, and outputting two data sets which correspond to the antennas under one-to-one correspondence, wherein, each symbol set comprises M symbols.

Denoting the 2M-point data set outputted by the M-DFT module 102 by $\{S_1, S_2, \ldots, S_M, S_M, \ldots, S_{2M}\}$, then the two branches of data outputted by the de-multiplexing module 103 i.e., two symbol sets each comprising M symbols can be $\{S_1, S_2, \ldots, S_M\}$ and $\{S_{M+1}, \ldots, S_{2M}\}$. The space-time coding module 104 encodes the two branches of data and yields two branches of data, $\{S_1, S_2, \ldots, S_M, -S_{M+1}^*, \ldots, -S_{2M}^*\}$ and $\{S_{M+1}, S_{M+2}, \ldots, S_{2M}, S_1^*, \ldots, S_M^*\}$. Then, the two data sets (branches of data) are mapped onto two antennas by two sub-carrier mapping means 105 respectively, that is to say, mapping the front M data and rear M data of each set to two consecutive SC-FDMA symbols, and the specific mapping of the M data of each SC-FDMA symbol complies with the sub-carrier resources allocated to the user.

The data after mapping satisfy:

the symbols mapped onto each antenna keep the same sequence as compared with the M symbols outputted by the M-point DFT module;

the mapped symbols keep the same sub-carrier interval; and the M data of each mapped SC-FDMA symbol are the M outputted data of the DFT module, or the inverse of the M outputted data, or the complex conjugate of the M outputted data, or the inverse complex conjugate of the M outputted data.

Generally speaking, there are two types of mapping: centralized sub-carrier mapping and distributed sub-carrier mapping. Centralized sub-carrier mapping means to map M data to M consecutive sub-carriers, while distributed sub-carrier mapping means to map M data to M sub-carriers with certain spacing.

It should be noted that, space-time coding does not encode the consecutive symbols (e.g. $S_1$ and $S_2$) of one symbol set outputted by the M-point DFT module with Alamouti code, instead, the space-time coding encodes the corresponding symbols of two adjacent symbol sets outputted by the module with Alamouti code, for instance, it encodes $S_1$, the first symbol of the first symbol set with $S_{M+1}$, the first symbol of the second symbol set, the encoding matrix is as follows:

$$\begin{bmatrix} S_1 & -S_{M+1}^* \\ S_{M+1} & S_1^* \end{bmatrix}$$

Each row represents one transmitting antenna and each column represents one SC-FDMA symbol, for example, $S_1$ is sent on the first SC-FDMA symbol by the first transmitting antenna, $-S_{M+1}^*$ is sent on the second SC-FDMA symbol by the first transmitting antenna, etc. Wherein, the superscript "*" denotes conjugate.

Figure 2B:
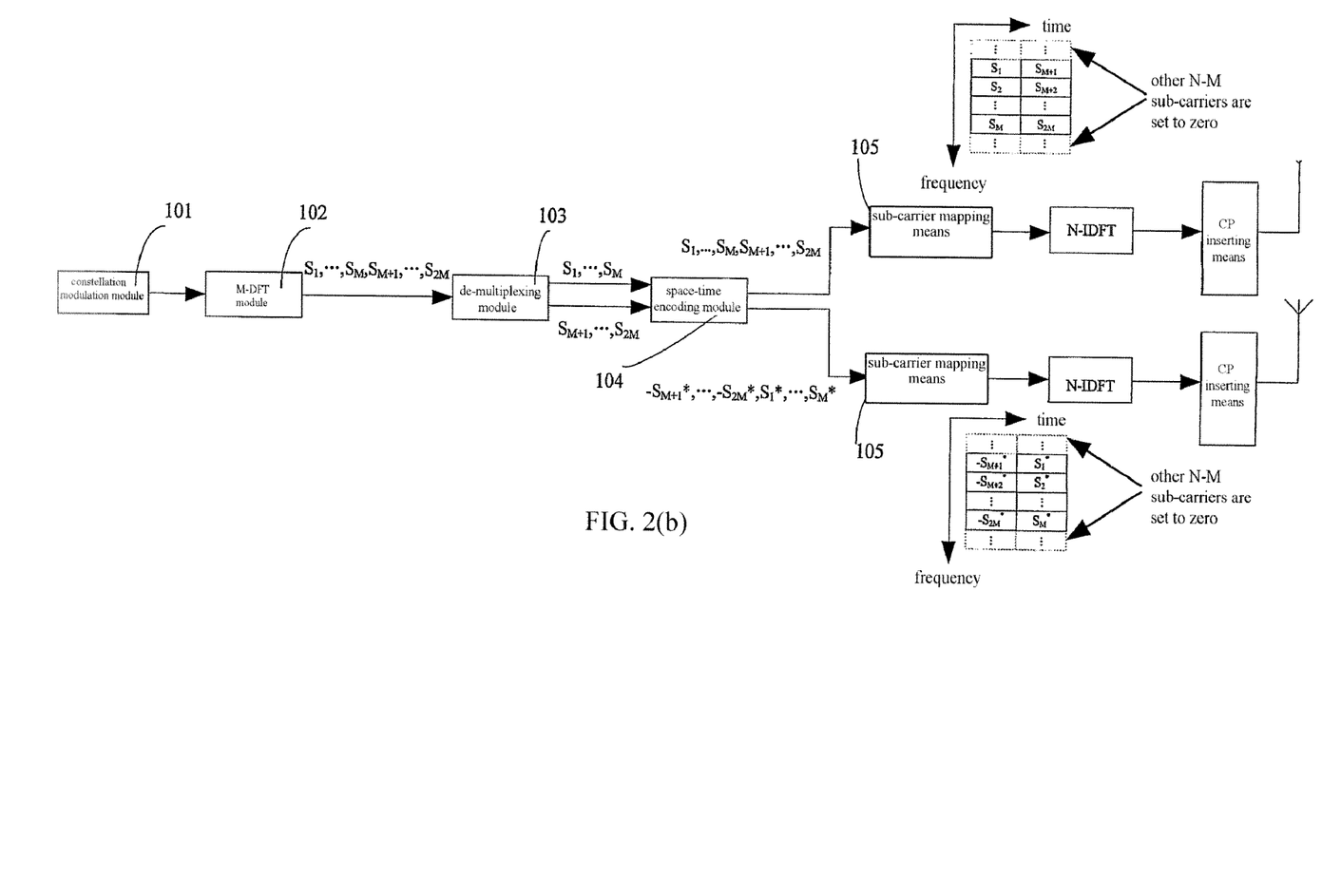

It should be noted that with the two input streams $\{S_1, S_2, \ldots, S_M\}$ and $\{S_{M+1}, \ldots, S_{2M}\}$, the space-time encoding module can also give the output streams as $\{S_1, S_2, \ldots, S_M, S_{M+1}, S_{M+2}, \ldots, S_{2M}\}$ and $\{-S_{M+1}^*, \ldots, -S_{2M}^*, S_1^*, \ldots, S_M^*\}$ respectively. In this case, the device for the baseband process of the space-time diversity transmitter for SC-FDMA systems is illustrated in FIG. 2(b).

The aforesaid space-time encoding and mapping have the following advantages and functions: they can reduce the peak-to-average power ratio (PAPR) of the transmitting signal effectively so as to enable the high efficiency of the power amplifier in the transmitter, thus prolonging the battery lifespan of the mobile terminal (MT) in the uplink communication (i.e., the communication link from the MT to the base station), or equivalently, with the same battery using time, less PAPR makes bigger transmitting power of the MT possible, so that the coverage of the cell can be broaden effectively.

Figure 3:
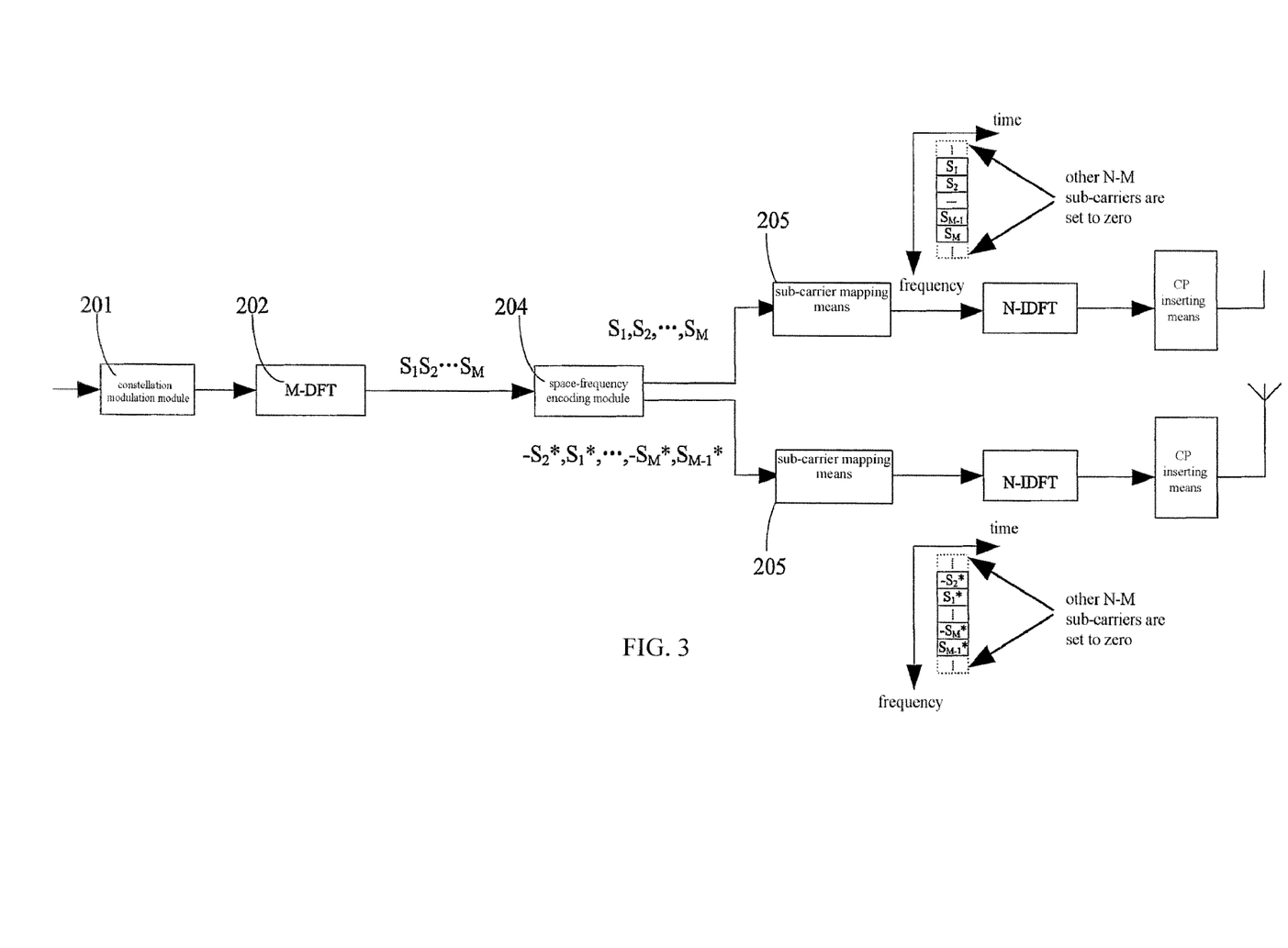
FIG. 3 illustrates the structure diagram for baseband process of space-frequency diversity transmitter of the SC-FDMA system of the invention.

II. The space-frequency diversity transmitter and the method and devices for the baseband process of the space-frequency diversity transmitter in the SC-FDMA system The space-frequency diversity transmitter of the invention comprises a constellation modulation module 201, an M-point DFT module 202, a space-frequency encoding module 204 and two sub-carrier mapping means 205.

FIG. 3 describes the sub-carrier mapping module 205 which takes the centralized sub-carrier mapping as an example.

Still referring to FIG. 3, different from the space-time transmitter, the outputs of sub-carrier mapping module 205 are only mapped onto the sub-carriers allocated to one SC-FDMA symbol. Additionally, only one space-frequency encoding scheme given in FIG. 3 (represented as SFC2 in FIG. 5) is recommended for spaces-frequency encoding module 204, i.e., the two data sets got by encoding and mapping the input $\{S_1, S_2, \ldots, S_M\}$ are $\{S_1, S_2, \ldots, S_M\}$ and $\{-S_2^*, S_1^*, \ldots, -S_M^*, S_{M-1}^*\}$, instead of $\{S_1, -S_2^*, \ldots, S_{M-1}, -S_M^*\}$ and $\{S_2, S_1^*, \ldots, S_M, S_{M-1}^*\}$ or other space-frequency encoding and mapping schemes. This is distinct from the space-time diversity system, the space-time encoding module of which can employ two different encoding schemes.

The mapping means comprises two sub-carrier mapping means that map the data sets outputted by the space-frequency device to the corresponding antennas, and the data after mapping satisfy:
  the symbols mapped onto at least one antenna keep the same sequence as compared with the M symbols outputted by the M-point DFT module;
  the mapped symbols keep the same sub-carrier interval; and
  the M data of each mapped SC-FDMA symbol are the M outputted data of the DFT module, or the complex conjugate of the M outputted data with or without inverse operation.

The space-frequency coding scheme shown in FIG. 3 reduces the PAPR of the transmitting signal to the utmost, thus the efficiency of the power amplifier of the MT can be improved.

The method for the baseband process of the space-frequency diversity transmitter comprises the following steps:
  Denoting the M-point data set outputted by the M-point DFT module of the system as $\{S_1, S_2, \ldots, S_M\}$, after Alamouti encoding, the outputs are two data sets: $\{S_1, S_2, \ldots, S_M\}$ and $\{-S_2^*, S_1^*, \ldots, -S_M^*, S_{M-1}^*\}$, wherein the superscript "*" denotes conjugate.

The two data sets are mapped to two antennas respectively, i.e. the M data are mapped onto only one SC-FDMA symbol.

It should be noted that in FIG. 2 and FIG. 3, the sub-carrier mapping is described with the centralized sub-carrier mapping as an example, as a matter of fact, the space-time and space-frequency diversity transmitter can also be designed with the distributed sub-carrier mapping scheme.

III. The spatial diversity transmitter and the method and devices for the baseband process of the spatial diversity transmitter in the SC-FDMA system.

Figure 6:
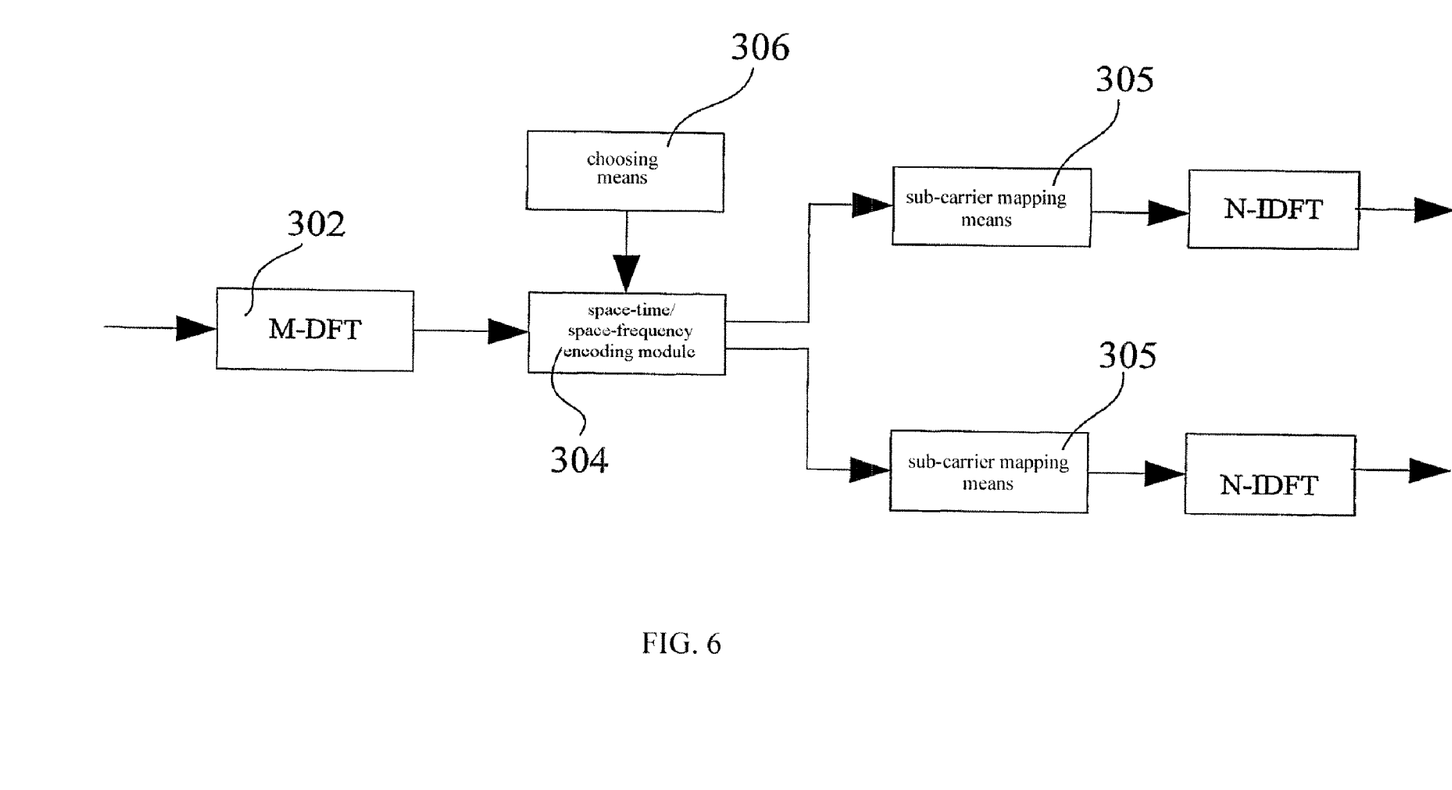
FIG. 6 illustrates the structure diagram for baseband process of spatial diversity transmitter of the SC-FDMA system of the invention.

With reference to the FIG. 6, the spatial diversity transmitter of the invention comprises an M-point DFT module 302, a space-time/space-frequency encoding means 304, a choosing means 306 and two sub-carrier mapping means 305, the choosing means is used to choose space-time diversity or space-frequency diversity transmitting method, and the encoding means 304 performs space-time or space-frequency in accordance with the transmitting method chosen by the choosing means. The encoding means 304 is connected to the output end of the M-point DFT module 302, wherein, M represents the amount of sub-carriers allocated to the user.

When the encoding means 304 is used for space-time encoding, it encodes the corresponding symbols from two adjacent symbol sets outputted by the M-point DFT module 302 with Alamouti code, and outputs two data sets respectively corresponding to two transmitting antenna. Wherein, each symbol set comprises M symbols, two sub-carrier mapping means 305 map the data sets respectively to the corresponding antennas, so that the data after mapping satisfy:
  the symbols mapped onto each antenna keep the same sequence as compared with the M symbols outputted by the M-point DFT module;
  the mapped symbols keep the same sub-carrier interval; and
  the M data of each mapped SC-FDMA symbol are the M outputted data of the DFT module, or the inverse of the M outputted data, or the complex conjugate of the M outputted data, or the inverse complex conjugate of the M outputted data.

When the encoding means 304 is used for space-frequency encoding, it encodes the M consecutive symbols outputted by the M-point DFT module 302 with Alamouti code, and outputs two data sets correspond to two antennas respectively, the two sub-carrier mapping means 305 map the two data sets respectively to two antennas, and the data after mapping should meet the following requirements:

the symbols mapped onto at least one antenna keep the same sequence as compared with the M symbols outputted by the M-point DFT module;
  the mapped symbols keep the same sub-carrier interval; and
  the M data of each mapped SC-FDMA symbol are the M outputted data of the DFT module, or the inverse of the M outputted data, or the complex conjugate of the M outputted data, or the inverse complex conjugate of the M outputted data.

In addition, the computer simulation and analysis on the PAPR are carried out with respect to the space-time and space-frequency diversity transmitting solution of the SC-FDMA system in the invention, as depicted in FIG. 4 and FIG. 5. The parameters in the simulation are chosen as follows: N=1024, M=64.

Figure 4A:
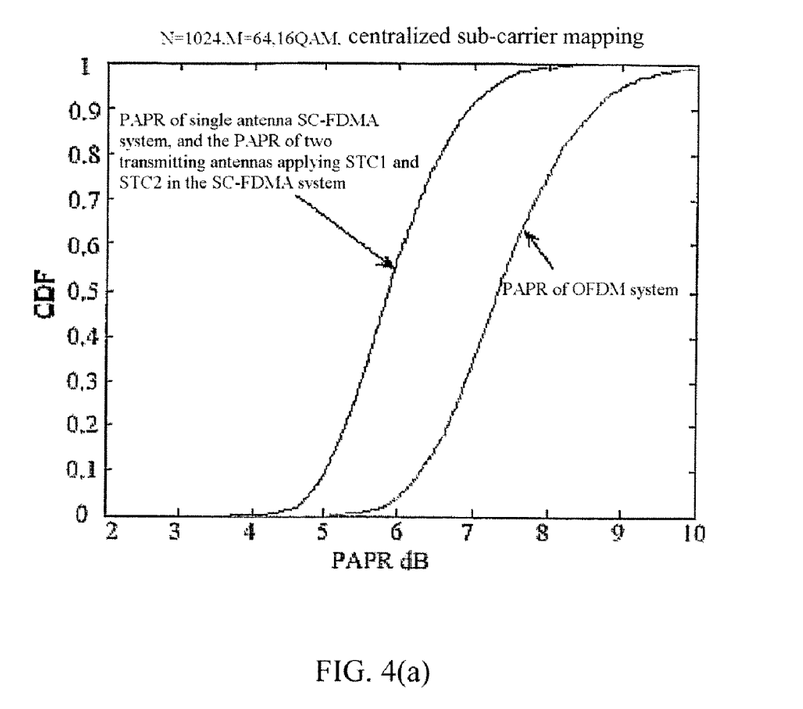
FIG. 4(a) and FIG. 4(b) illustrate the simulation results of the centralized sub-carrier mapping and distributed sub-carrier mapping respectively.
Figure 4B:
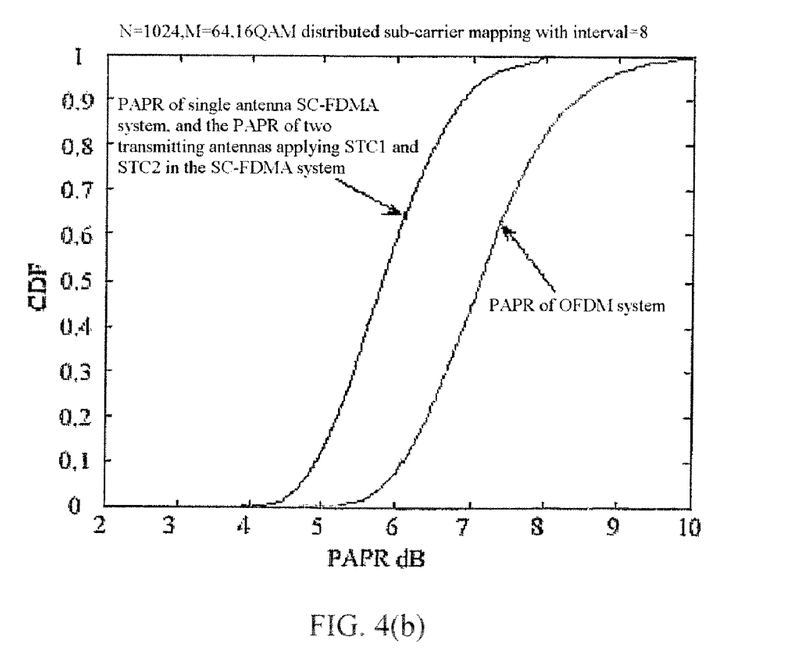

FIG. 4 shows the comparison of the PAPR of the two transmitting antennas in the space-time diversity SC-FDMA system with other solutions wherein, Fig (a) and Fig. (b) show the simulation results of the centralized sub-carrier mapping and distributed sub-carrier mapping respectively. The STC (i.e. Space-time encoding, or space-time scheme) 1 in the curve label corresponds to the solution in FIG. 2(*a*) while STC2 in the curve label corresponds to the solution in FIG. 2(*b*).

In the distributed sub-carrier mapping, let the distributed interval to be 8. From the figure, it can be seen that, under the simulation condition, the PAPR in the space-time diversity system disclosed by the invention is the same as the single antenna scheme, and the solution of the invention also reduces PAPR by 1.5 db compared with that of the OFDM system with the same environment. Furthermore, from the figure, it is clear that the PAPR values keep substantially the same in both the centralized and the distributed solution.

Figure 5A:
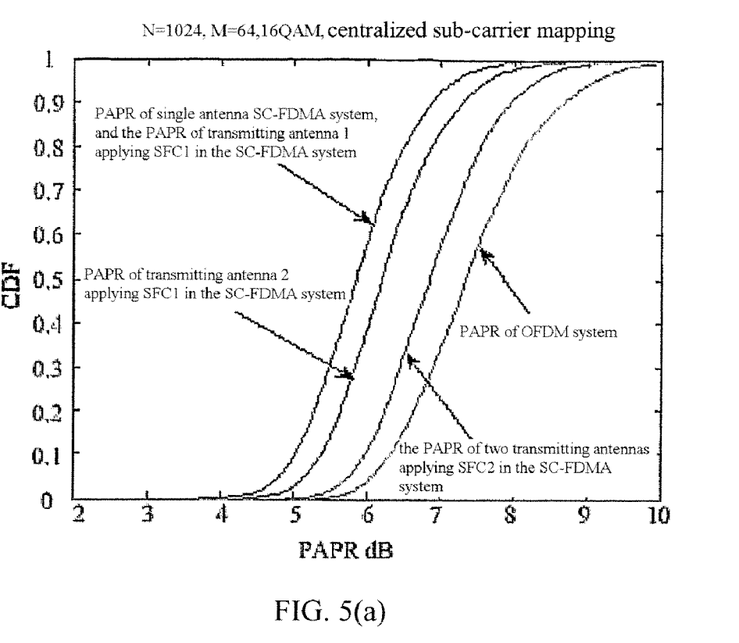
Figure 5B:
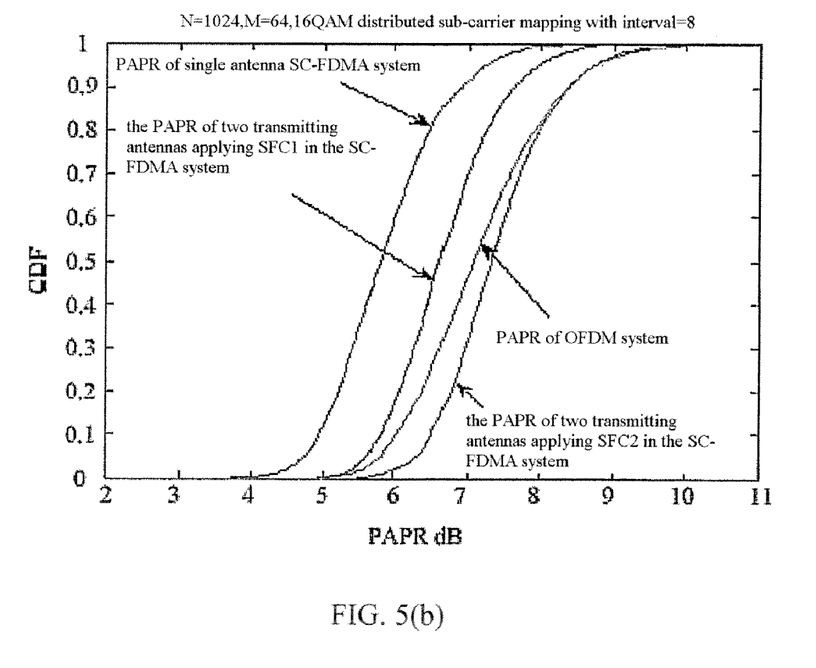

FIG. 5 shows the comparison of the PAPR of the two transmitting antennas in the space-frequency diversity SC-FDMA system with other solutions, wherein, FIG. (a) and FIG. (b) represent the simulation results of the centralized sub-carrier mapping and distributed sub-carrier mapping respectively. The SFC (i.e. Space-frequency encoding, or space-frequency scheme) 1 in the curve label corresponds to the solution in FIG. 3 while SFC2 represents another space-frequency encoding and mapping solution.

In the distributed sub-carrier mapping, since the space-frequency detection is carried out under the assumption that the channel coefficients corresponding to the two sub-carriers in the space-frequency encoding should be approximately the same, i.e., the so-called channel quasi-static condition, therefore, in the simulation, the paired distributed mapping method is employed, and the interval between the adjacent pair of the sub-carrier is 8 sub-carriers. From the figure, it can be seen that, under the centralized mapping condition, the PAPR of antenna 1 in the space-frequency diversity system disclosed by the invention is the same as the single antenna scheme and the antenna 2 is 0.4 db worse than the single antenna. As for the other space-frequency encoding scheme, the two antennas are both approximately 1 db worse than the single antenna, therefore, only the space-frequency encoding method described above is recommended. Further, from the figure, it can be seen that for the distributed mapping method, the PAPR value yields by the design disclosed by the invention is about 0.7 db worse than the single antenna, but still 0.8 db better than that of the OFDM system.

Although preferred embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. Moreover, although specific terms are employed herein, they are used in a generic and descriptive sense only, and not for the purposes of limiting the described invention.

What is claimed:

1. A device for the baseband process of a space-time diversity transmitter, comprising an M-point DFT module, a space-time encoder and a mapper, wherein:
  said space-time encoder is connected between the output end of said M-point DFT module and the input end of said mapper, wherein, M represents the amount of sub-carriers allocated to a user;
  wherein said space-time encoder is operative to encode corresponding symbols from at least two adjacent symbol sets, said two adjacent symbol sets being outputted by the M-point DFT module, and outputting at least two data sets, two data sets of the at least two data sets corresponding to two transmitting antennas under one-to-one correspondence, wherein: each of said symbol sets comprises M symbols;
  said mapper comprises at least two sub-carrier mappers, said two sub-carrier mappers being operative to map the two data sets to the corresponding antennas, so that the data after mapping satisfy:
  the symbols mapped onto each antenna keep the same sequence as compared with the M symbols outputted by the M-point DFT module; and/or
  the mapped symbols keep the same sub-carrier interval; and/or
  the M data of each mapped SC-FDMA symbol are the M outputted data of the DFT module, or the inverse of the M outputted data, or the complex conjugate of the M outputted data, or the inverse complex conjugate of the M outputted data.

2. The device according to claim 1, wherein: said encoding uses Alamouti code.

3. The device according to claim 1, wherein: said outputted symbols of the M-point DFT module are connected to said space-time encoder via a de-multiplexing module.

4. The device according to claim 1, wherein: said sub-carrier mapper employs a centralized sub-carrier mapping.

5. The device according to claim 1, wherein: said sub-carrier mapper employs a distributed sub-carrier mapping.

6. A space-time diversity transmitter, wherein the transmitter comprises the device according to claim 1 that is connected between a constellation modulator at the front end of the transmitter and an N-point IDFT module at the rear end of the transmitter.

7. A method for the baseband process of the space-time diversity transmission, comprising:
  de-multiplexing the 2M-point data set denoted as $\{S_1, S_2, \ldots, S_M, S_{M+1}, \ldots, S_{2M}\}$, outputted by the M-point DFT module of the system, into two adjacent symbol sets: $\{S_1, S_2, \ldots, S_M\}$, and $\{S_{M+1}, \ldots, S_{2M}\}$;
  space-time encoding the data of corresponding symbols from said two adjacent symbol sets with Alamouti code, and outputting two data sets;
  mapping said two data sets respectively to two antennas, so that the data after mapping satisfy:

the symbols mapped onto each antenna keep the same sequence as compared with the M symbols outputted by the M-point DFT module; and/or the mapped symbols keep the same sub-carrier interval; and/or the M data of each mapped SC-FDMA symbol are the M outputted data of the DFT module, or the inverse of the M outputted data, or the complex conjugate of the M outputted data, or the inverse complex conjugate of the M outputted data.

8. The method according to claim 7, wherein the two data sets outputted by the space-time encoding step are in the forms of $\{S_1, S_2, \ldots, S_M, -S_{M+1}^*, \ldots, -S_{2M}^*\}$ and $\{S_{M+1}, S_{M+2}, \ldots, S_{2M}, S_1^*, \ldots, S_M^*\}$, wherein the superscript "*" denotes conjugate.

9. The method according to claim 7, wherein the two data sets outputted by the space-time encoding step are in the forms of $\{S_1, S_2, \ldots, S_M, S_{M+1}, S_{M+2}, \ldots, S_{2M}\}$ and $\{-S_{M+1}^*, \ldots, -S_{2M}^*, S_1^*, \ldots, S_M^*\}$, wherein the superscript "*" denotes conjugate.

10. A device for a baseband process of a space-frequency diversity transmitter, comprising an M-point DFT module, a space-frequency encoder and a mapper wherein:

said space-frequency encoder is connected between an output end of said M-point DFT module and an input end of mapper, and is used to encode the consecutive M symbols outputted by said M-point DFT module, and to output at least two data sets, said at least two data sets corresponding to respective transmitting antennas, wherein, M represents the amount of sub-carriers allocated to a user.

11. The device according to claim 10, wherein said mapper comprises at least two sub-carrier mappers two of said at least two sub-carrier mappers being operative to map the data sets outputted by the space-frequency encoding module onto the corresponding antennas, so that the data after mapping satisfy:

the symbols mapped onto at least one antenna keep the same sequence as compared with the M symbols outputted by the M-point DFT module; and/or the mapped symbols keep the same sub-carrier interval; and/or the M data of each mapped SC-FDMA symbol are the M outputted data of the DFT module, or the inverse of the M outputted data, or the complex conjugate of the M outputted data, or the inverse complex conjugate of the M outputted data.

12. The device according to claim 11, wherein said sub-carrier mapper employs a centralized sub-carrier mapping.

13. The device according to claim 11, wherein said sub-carrier mapper employs a distributed sub-carrier mapping.

14. A space-frequency diversity transmitter, wherein the transmitter comprises the device according to claim 11 that is connected between a constellation modulator at the front end of the transmitter and an N-point IDFT module at the rear end of the transmitter.

15. A method for a baseband process of a space-frequency diversity transmission, comprising:

space-frequency encoding by denoting an M-point data set outputted by an M-point DFT module of the system as $\{S_1, S_2, \ldots, S_M\}$, encoding the data set with Alamouti code, and outputting two data sets: $\{S_1, S_2, \ldots, S_M\}$ and $\{-S_2^*, S_1^*, \ldots, -S_M^*, S_{M-1}^*\}$, wherein, the superscript "*" denotes conjugate;

mapping said two data sets to two antennas respectively, so that the data after mapping satisfy:

the symbols mapped onto at least one antenna keep the same sequence as compared with the M symbols outputted by the M-point DFT module; and/or the mapped symbols keep the same sub-carrier interval; and/or the M data of each mapped SC-FDMA symbol are the M outputted data of the DFT module, or the inverse of the M outputted data, or the complex conjugate of the M outputted data, or the inverse complex conjugate of the M outputted data.

16. A device for the baseband process of the spatial diversity transmitter, comprising an M-point DFT module, an encoder and a mapper, as well as selector which is connected to the encoder and used to choose a space-time diversity or space-frequency diversity transmitting method, said encoder performs space-time or space-frequency encoding in accordance with the transmitting method chosen by the selector wherein said encoder is connected between the output end of said M-point DFT module and the input end of said mapper wherein, M represents the amount of sub-carriers allocated to a user.

17. The device according to claim 16, wherein when said encoder is used for space-time encoding, the encoder encodes corresponding symbols from at least two adjacent symbol sets, at least two of said at least two adjacent symbol sets being outputted by the M-point DFT module, and outputs at least two data sets, at least two of said at least two data sets corresponding to at least two respective transmitting antennas, wherein, each symbol set comprises M symbols;

said mapper comprises at least two sub-carrier mappers at least two of said at least two sub-carrier mappers being operative to map the data sets to the corresponding respective antennas, such that the data after mapping satisfy:

the symbols mapped onto each antenna keep the same sequence as compared with the M symbols outputted by the M-point DFT module;

the mapped symbols keep the same sub-carrier interval; and the M data of each mapped SC-FDMA symbol are the M outputted data of the DFT module, or the inverse of the M outputted data, or the complex conjugate of the M outputted data, or the inverse complex conjugate of the M outputted data.

18. The device according to claim 16, wherein when the encoder is used for space-frequency encoding, the encoder encodes the M consecutive symbols outputted by the M-point DFT module, and outputs at least two data sets, at least two of the at least two data sets corresponding to respective antennas under a one-to-one correspondence;

said mapper comprises at least two sub-carrier mappers at least two of said at least two sub-carrier mappers being operative to map said data sets respectively to the corresponding antennas, and the data after mapping satisfy:

the symbols mapped onto at least one antenna keep the same sequence as the M symbols outputted by the M-point DFT module; and/or the mapped symbols keep the same sub-carrier interval; and/or the M data of each mapped SC-FDMA symbol are the M outputted data of the DFT module, or the inverse of the M outputted data, or the complex conjugate of the M outputted data, or the inverse complex conjugate of the M outputted data.

* * * * *